United States Patent

Heine et al.

[11] Patent Number: 6,005,748
[45] Date of Patent: Dec. 21, 1999

[54] SPINDLE MOTOR WITH MULTIPLE THRUST PLATE FLUID DYNAMIC BEARING

[75] Inventors: Gunter Karl Heine, Aptos; Raquib Uddin Khan, Pleasanton; Mohamed Mizanur Rahman, San Jose; Hans Leuthold, Santa Cruz, all of Calif.

[73] Assignee: Seagate Technology, Inc., Scotts Valley, Calif.

[21] Appl. No.: 08/994,100

[22] Filed: Dec. 19, 1997

Related U.S. Application Data

[60] Provisional application No. 60/044,171, Apr. 23, 1997.

[51] Int. Cl.$^6$ ................................................. G11B 17/02
[52] U.S. Cl. ......................................................... 360/99.08
[58] Field of Search ............................... 360/98.07, 99.08

[56] References Cited

U.S. PATENT DOCUMENTS

| | | | |
|---|---|---|---|
| 5,379,169 | 1/1995 | Sanada | 360/99.08 |
| 5,471,104 | 11/1995 | Toshimitsu | 310/90 |
| 5,559,651 | 9/1996 | Grantz | 360/99.08 |
| 5,697,708 | 12/1997 | Leuthold | 384/110 |

*Primary Examiner*—A. V. Heinz
*Attorney, Agent, or Firm*—Flehr Hobach Test Albritton & Herbert Ltd.

[57] ABSTRACT

A method to create an improved hydrodynamic bearing which is relatively insensitive to changes in load and rotational speed is provided, wherein the hydrodynamic bearing is useful in a spindle motor for a disc drive or the like which is stiffer than known standard spindle motors so that the stability of the system and specifically of the actuator arm and transducer relative to the rotating disc is optimized. The hydrodynamic bearing can also be used as a bearing cartridge or as the cartridge that may be incorporated into a spindle motor or the like, where the bearing includes a shaft and at least two independent bearings each comprising a thrust plate supported on the shaft and a counter plate incorporated in a sleeve which is capable of relative rotation around the shaft.

14 Claims, 3 Drawing Sheets

SPINDLE MOTOR WITH MULTIPLE THRUST PLATE FLUID DYNAMIC BEARING

CROSS-REFERENCE TO RELATED APPLICATION

This application is a continuation of U.S. Provisional Patent Application, Ser. No. 60/044,171 filed Apr. 23, 1997, assigned to the assignee of this application and incorporated herein by reference.

Reference should also be made to U.S. patent application, Ser. No. 09/043,065, filed Jul. 31, 1998, (Attorney Docket No. A-65138/JAS) pending; U.S. patent application Ser. No. 08/981,548, filed Dec. 19, 1997 (Attorney Docket No. A-65139/JAS) pending; and U.S. patent application Ser. No. 08/981,338, filed Dec. 19, 1997 (Attorney Docket No. A-64699/JAS) pending; all of which are assigned to the assignee of this invention and are incorporated herein by reference.

FIELD OF THE INVENTION

The present invention relates to magnetic disc drive storage systems, and more specifically, the present invention relates to a hydrodynamic fluid bearing for use in a magnetic disc drive storage system.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as air or liquid provides a bearing surface between a fixed member of the housing and a rotating member of the disc hub. In addition to air, typical lubricants include oil or ferromagnetic fluids. Hydrodynamic bearings spread the bearing interface over a large surface area in comparison with a ball bearing assembly which comprises a series of point interfaces. This is desirable because the increased bearing surface reduces wobble or run-out between the rotating and fixed members. Moreover, the use of fluid in the interface area imparts damping effects to the bearing which helps to reduce non-repetitive runout.

However, hydrodynamic bearings themselves suffer from disadvantages, including a low stiffness-to-power ratio. These problems lead to a high sensitivity of the bearing to external loads or shock.

SUMMARY OF THE INVENTION

Thus, it is an object of the present invention to create an improved hydrodynamic bearing which is relatively insensitive to changes in load and rotational speed.

Another objective of the invention is to provide a hydrodynamic bearing having increased stiffness.

Another objective of the invention is to provide a hydrodynamic bearing useful in a spindle motor for a disc drive or the like which is stiffer than known standard spindle motors so that the stability of the system and specifically of the actuator arm and transducer relative to the rotating disc is optimized.

These and other objectives of the present invention are achieved by providing a hydrodynamic bearing useful as a bearing cartridge or as the cartridge may be incorporated into a spindle motor or the like, where the bearing includes a shaft and at least two independent bearings each comprising a thrust plate supported on the shaft and a counter plate and/or a sleeve which is capable of relative rotation around the shaft. The use of multiple thrust plates maintains and even increases the stiffness of the overall design without any attendant increase in power consumption. Further, the manufacturing and assembly process does not become more difficult because the gap may be maintained at a reasonable width.

More specifically, in an exemplary embodiment the bearing includes a fixed shaft and a sleeve rotating around and surrounding the shaft, and at least first and second thrust plates separated by a portion of the shaft. In one example, the shaft includes a central reservoir or hole and one or more ports between the reservoir and a gap defined between the shaft and the sleeve to allow fluid movement through the hydrodynamic bearing. Grooves can be found on shaft or sleeve to enhance fluid circulation through the gaps defined by the shaft and the thrust plates supported thereon and the surrounding sleeve with counter-plates, as well as to increase stiffness. Grooves could also appear on one or more of the counterplates, or on a thrust plate surface, or a combination of both thrust plate and counterplate.

To enhance the fluid pressure balance and fluid movement, the bores may include at least one radial bore between each pair of thrust plates, and a further radial bore below the lowermost thrust plate.

Assembly is enhanced by providing axially separated steps in the sleeve so that the shaft and thrust plates may be inserted into the sleeve, with counterplates then placed against the steps in the sleeve.

Other features and advantages of the present invention will become apparent to a person of skill in the art who studies the present invention disclosure, given with respect to the following figures.

DETAILED DESCRIPTION OF A PREFERRED EMBODIMENT

Figure 1:
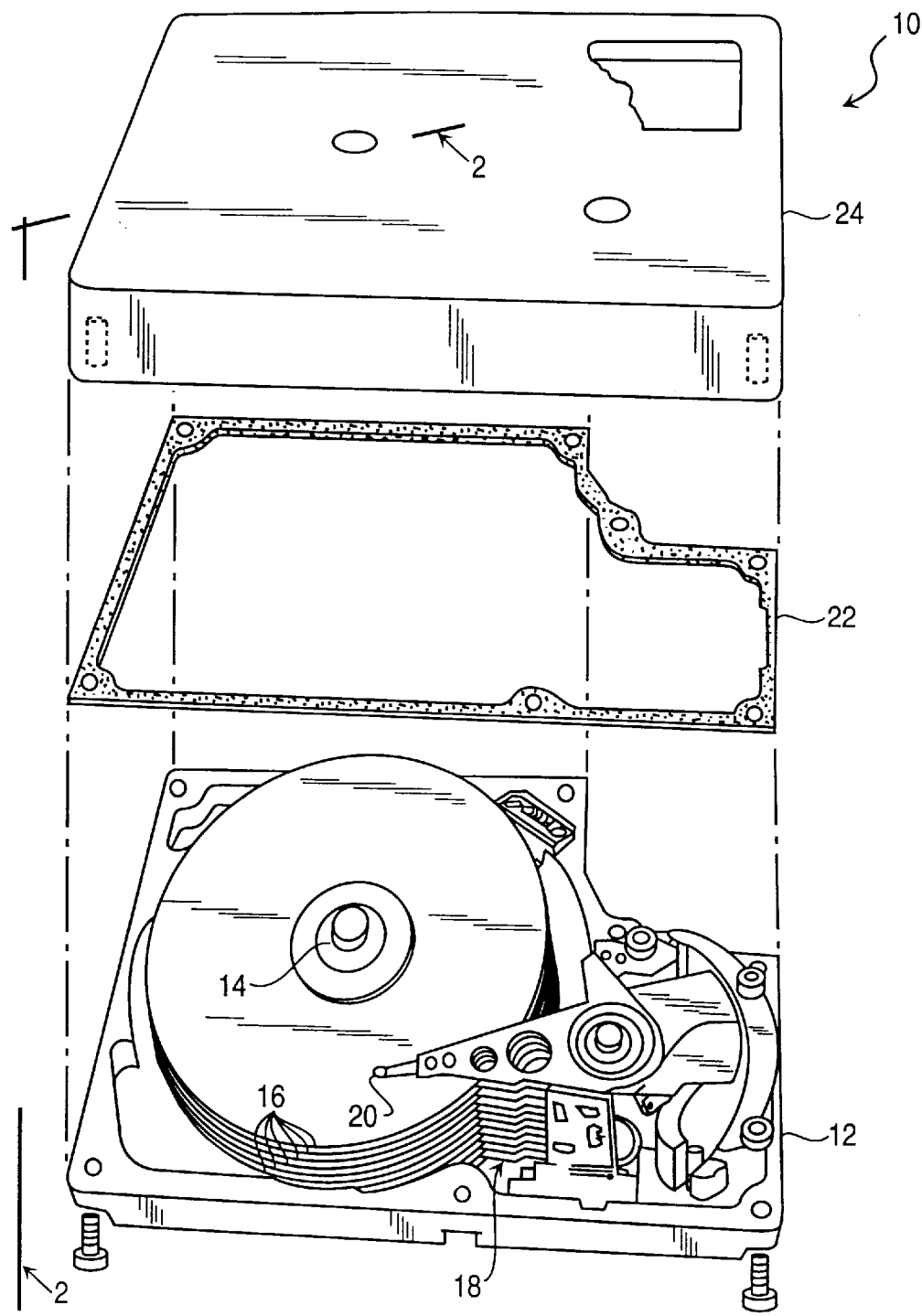
FIG. 1 is a perspective view of a magnetic disc storage system which may incorporate the hydrodynamic bearing cartridge and spindle motor in accordance with the present invention.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing cartridge is not limited to use with this particular design of a disc drive, which is shown only for purposes of the example. Given the many advantages which this invention achieves, it could also potentially be used to support the actuator for rotation. The bearing cartridge also has numerous other uses outside of the field of disc drives.

Further, the fluid bearing disclosed herein has a fixed shaft and rotating, surrounding sleeve.

In this particular example, the storage system 10 includes a housing base 12 having spindle motor 14 which carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a large number of radially differentiated tracks on the surface of the discs 16. This allows the transducers 20 to read and write magnetically encoded information on the surfaces of discs 16 at selected locations. The discs rotate at very high speeds, several thousand RPM, in order to maintain the transducer flying over the surface of the disc. In present day technology, the spacing distance between the transducer and the rotating disc surface is measured in microinches; thus it is absolutely essential that the disc does not tilt or wobble.

Figure 2:
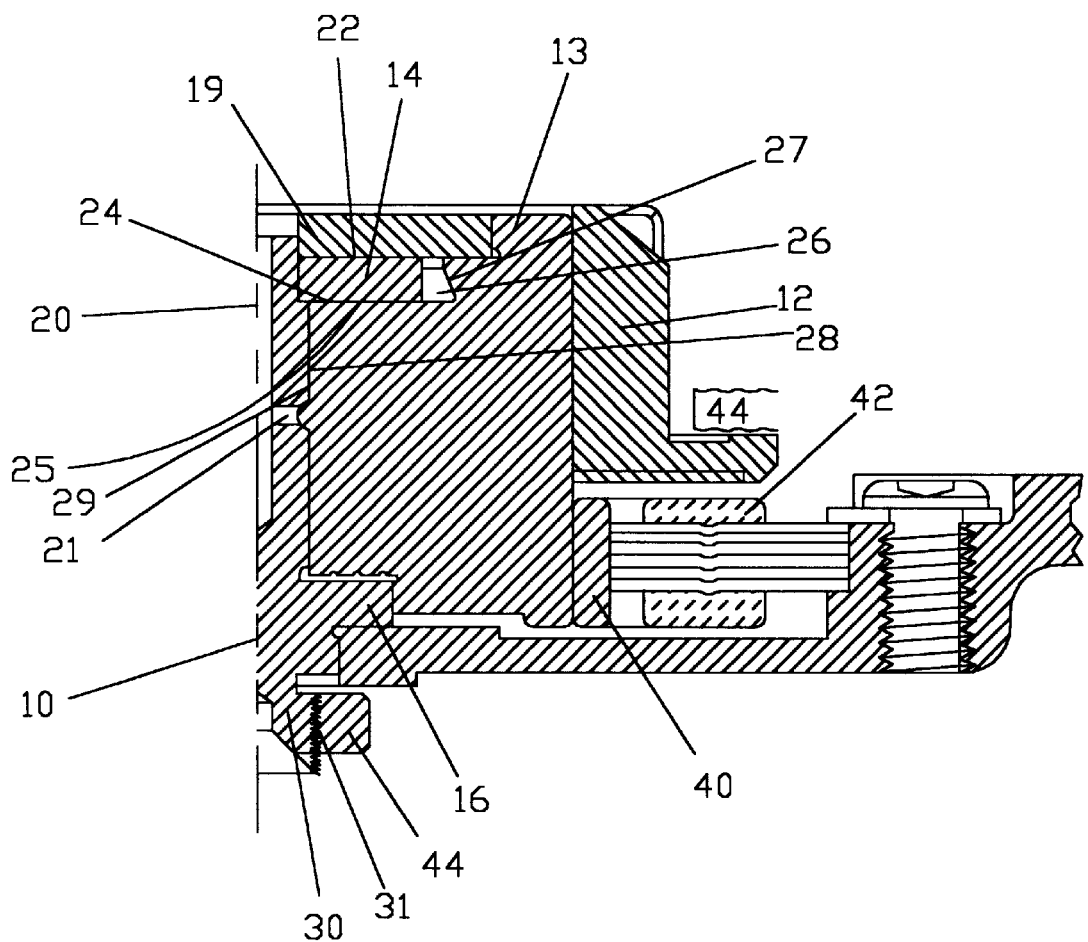
FIG. 2 is a vertical sectional view of a prior art hydrodynamic bearing cartridge incorporated in a spindle motor assembly.

FIG. 2 is a vertical sectional view of a single thrust plate hydrodynamic bearing motor design of a type which is already established in this technology. The basic structure of the motor shown in this figure includes a stationary shaft 10 and a hub 12 supported from a sleeve 13 for rotation around the shaft. The shaft 10 includes a thrust plate 14 at one end, and terminates in a shoulder 16 at the opposite end. The sleeve 13 supports a counterplate 19 at one end, for rotation over the thrust plate 14. The counterplate 19 and thrust plate 14 are separated by a sufficient gap 22 to allow movement of lubricating fluid to lubricate the hydrodynamic bearing through the central hole or reservoir 20, through the gap 22, through the reservoir 26 defined between the end of the thrust plate 14 and an interior surface 27 of the sleeve 13, and between the lower surface 24 of the thrust plate 14 and an upper surface 25 of the sleeve 13, and between an inner surface 28 of the sleeve and the exterior surface 29 of the fixed shaft. The fluid path is completed to reservoir 20 primarily through a central bore 21. In order to promote the flow of fluid over the bearing surfaces which are defined between the thrust plate 14 and the counterplate 19; between the thrust plate 14 and the sleeve 13, and between the shaft 10 and the sleeve 13, typically one of the two opposing surfaces of each such assembly carries sections of grooves as is well known in this technology.

The fluid flow between the bearing surfaces creates hydrodynamic pressure, resulting in stiffness. Circulation of fluid is maintained through central hole 20 of the shaft to the other bearing surfaces by the appropriate designing of geometry and grooving patterns of the baring surfaces. The remainder of the structure of significance which is used to complete the motor design include shaft extension 30 which ends in threaded region 31 which is threaded into a portion of the base 44. A stator 42 cooperates with magnets 40 which are supported from the sleeve 13, with energization of the stator windings 42 causing rotation of the sleeve 18 and the hub 12 about the stationary shaft.

As used in a disc drive motor, this system supports one or more discs 44 for rotation. Because the transducers and disc drives fly at extremely low heights over the surface of the disc, it is essential that there not be wobble or vibration of the hub and disc as it rotates. Moreover, it is also important that should such wobble occur, that there is no touch down between the surfaces of the thrust plate 14 and the opposing surface of the counterplate 19 and sleeve 13. However, as explained above, in a cantilever type bearing such as shown in FIG. 2, where the load carrying surface which is thrust plate 14 is located far from the center point about which any pivoting would occur in the event of vibration or wobble, there is a much greater chance of a touch down or contact between the facing surfaces, which would result in both wear of the surfaces over the long term, and a slow down of the rotational speed of the disc in the short term.

It is for this reason that the design of the following figures has been adopted. By adopting this design, load carrying surfaces, whether thrust or conical bearing type, are located closer to the middle of the overall hydrodynamic bearing system. The pivot point about which any rocking of the bearing may occur also lies close to the middle of the bearing. Because of this, by moving the load carrying surfaces as close as possible to the center of the disc, any wobbling or vibration of the disc would have less chance to cause touchdown at the ends of the bearing. Further, by adding two or more thrust plate surfaces, a great increase in overall stiffness can be achieved. Theoretically, the same result could be achieved by making the gap smaller, but the bearing becomes very difficult to manufacture.

Figure 3:
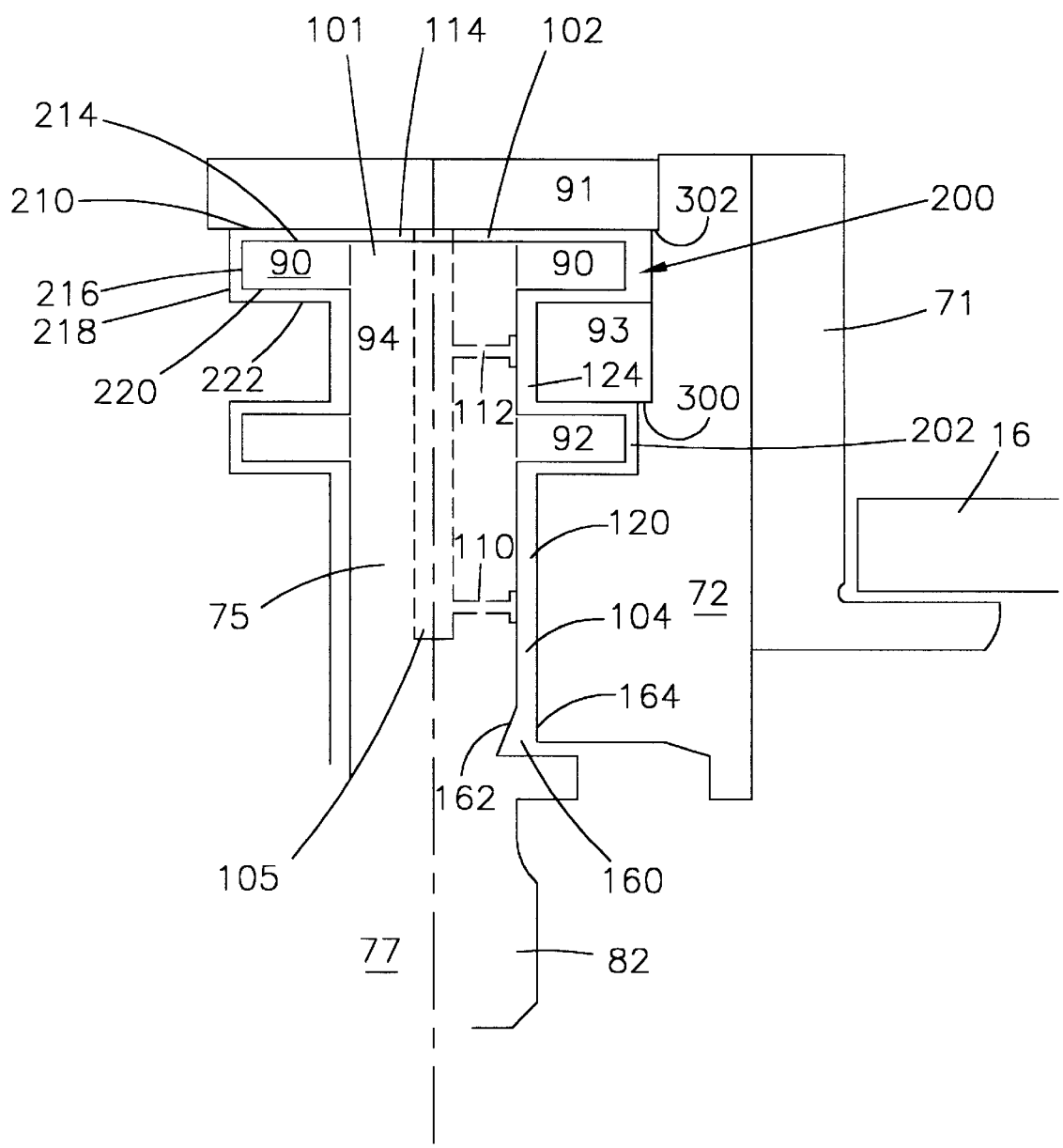
FIG. 3 is a vertical sectional view of a hydrodynamic bearing cartridge in accordance with the present invention.

Referring therefore to FIG. 3, it can be seen that this is a modification which could easily be incorporated into the design of FIG. 2 to form a cartridge which would have many uses, but would be especially useful for mounting a hub such as the hub 71 and to be incorporated into a disc drive. The upper end 101 of shaft 75 supports a thrust plate 90 which rotates below a counterplate 91 supported by sleeve 72; the bottom portion 77 of the shaft 75 is extended to mate with a base (not shown) as indicated and represented in FIG. 2 to support the motor or bearing.

So that the stiffness of the motor and its resistance to shock as well as its alignment to the rest of the system is enhanced and maintained, the design of the present invention includes at least two thrust plates 90, 92 each mounted on the shaft 75 and spaced apart by a region of the shaft 94. Each of the thrust plates 90, 92 are axially separated from the next by a counterplate 93; although this example shows only two thrust plates, multiple thrust plates may be mounted on the shaft. The thrust plate 92 closest to the base faces a section 103 of the sleeve 72 which serves as a counterplate. The top surface 214 of the upper thrust plate 90 faces a counterplate 91 which is supported from the sleeve 72.

The fluid bearing of this invention is defined between an inner surface of counterplates 91, 93, and sleeve 72 and the combined outer surfaces of shaft 75 and thrust plates 90, 92. Fluid is maintained in the gap 102 between the fixed portion of the fluid dynamic bearing and the rotating portion. In operation of the example of FIG. 3, the sleeve 72 rotates past shaft 75, creating pressure in the fluid bearing as explained above. The hydrodynamic fluid separates the rotating portion of the fluid dynamic bearing from the fixed portion, and provides a bearing surface there between.

The fluid is circulated to the bearing gap 102 through reservoir 105 which extends up the center of the shaft 75 and is connected by one or more radial bores 110, 112, to the gap 102. The first radial bore 110 connects the reservoir 105 with the lower gap section 120. A second radial bore 112 connects the reservoir 105 with the central section 124 of the gap. This provides a continuous path for the bearing fluid. The direction of flow or pressure gradients would be influenced by the grooves in the dynamic bearing formed in the gap and also by size and geometry of thrust plate and counter-plate, and in this example is indicated by the arrows drawn in the bores and reservoir. Other directions of flow or pressure gradients are within the scope of this invention. A reservoir here means that fluid in this region is inactive and does not contribute to the hydrodynamic bearing action except by circulation through itself. Finally, the reservoir communicates with upper gap section 114; grooves on either the facing surface of counterplate 91 or opposing surface of thrust plate 90 cause the appropriate fluid movement toward the other thrust plate and fluid return bore 112.

The lower end 104 of the circulation gap is closed off from the outer atmosphere by the form of capillary seal 160 in which the shaft wall section 162 is tapered while the sleeve wall section 164 extends straight. Since the shaft is to be fixed, this tapering of the shaft wall is possible, establishing the capillary seal 160. Alternatively, of course, the wall 164 of the sleeve 72 could be tapered. The design specifics of seal 160 are not critical, so long as an effective seal against leakage is provided at the end of the shaft.

To maintain and enhance the stability of the system, the hydrodynamic bearing fluid is in a narrow gap defined in part by the two thrust plates 90, 92. Each thrust plate 90, 92 rotates in a recess 200, 202 respectively defined at its end by an axial wall of the sleeve 72 and on either side by radial walls of the sleeve or counterplates. Thus, considering thrust plate 90, rotating in recess 200, the gap segments are defined by a radial wall 210 of counterplate 91, and a radial wall 214 of the thrust plate 90; then by an end wall 216 of the thrust plate, and an axial wall 218 of the sleeve 72; and finally the gap extends between a radial wall 220 of the thrust plate and a radial wall 222 of counterplate 93. The gap segments around thrust plate 92, and any additional thrust plates which may be mounted on the shaft 82, are similarly defined, so that a continuous gap 102 extending the length of the overlapping shaft and sleeve is defined.

The gaps provide for motion of the fluid between the fixed shaft and the rotating sleeve with the gaps providing for free rotation of the sleeve, while the presence of the fluid provides the necessary stiffness and damping, as well as lubrication for rotation of the bearing. As an example, depending on design, the fluid circulates from the reservoir 105 out through the lower bore 110, and into the upper gap 114 if it is provided; around the gaps provided around each thrust plate, and toward the center bore 112 which is the return bore for the fluid flowing through both circulation paths. Typically, to enhance and maintain the fluid flow and stiffness of the system, either the sleeve surfaces directly facing the shaft or the surfaces of the shaft, at the uppermost 101 and lowermost 104 sections of the gap, will be grooved using known spiral or herringbone or similar grooving patterns as are already well known in the art to provide the necessary circulation. Alternatively, or in addition, at least one surface of each thrust plate or the facing surface of the associated counterplate will be grooved. Such groove patterns are already well known and need not be spelled out in further detail. Typically, the axial surfaces defining the gap regions 200, 202 at the ends of the thrust plates 90, 92 are not grooved.

As can be seen from the figure, assembly is achieved by providing the sleeve 72 with stepped features 300, 302, which are axially separated and allow the counterplates 91, 93 to be press fitted (or any other suitable method) into place relative to the thrust plates with which they must cooperate. The thrust plates are mounted onto the shaft by any suitable method. To assemble the fluid dynamic bearing, the shaft 75 with the thrust plates 90, 92 is inserted into the sleeve; the counterplate 93 is guided into place by the stepped feature 300; then the top counterplate 91 is fixed in place on step 302 of sleeve 72.

The above described invention has a multitude of advantages. This multiple thrust plate arrangement enhances the axial stiffness to a considerable degree as well as rocking stiffness of the whole bearing. Further, the sleeve can be defined as a single section.

Also, there is considerable flexibility on power consumption and stiffness by the ease of adjusting the gap between the multiple thrust plates by adjusting the points of attachment of the thrust plates, and modifying the construction of the sleeve by moving the counterplates.

As disclosed above, this bearing can of course be used as a liquid bearing. However, it is also possible to use as a gas bearing which generates stiffness by multiple step pumping, i.e., by separately pumping sections of the gap around each of the thrust plates and the journal/sleeve regions. Thus as used in this application the term "fluid" shall be construed to mean either gas or liquid.

Other features and advantages of the present invention may become apparent to a person of skill in the art who studies the present invention disclosure. For example, the shaft may be extended beyond both (or all) thrust plates, rather than ending adjacent one plate, as described in the above incorporated application, without departing from the spirit of the invention. For example, it is possible to modify the location and design of the grooving patterns, to enhance or optimize the fluid circulation through the gaps without departing from the spirit and scope of the present invention, which is to be defined by the following claims.

What is claimed is:

1. A hydrodynamic fluid bearing cartridge comprising a fixed central shaft carrying at least first and second thrust plates separated by a circular shaft portion, at least one of said first and second thrust plates being separated from distal ends of said shaft by outer end sections of said shaft, each of said thrust plates comprising first and second radial surfaces extending from said shaft connected by an axial surface, and a sleeve which rotates relative to the fixed shaft around a central axis of rotation defined by a central axis of said shaft, said sleeve defining recesses for each of said first and second thrust plates, said recesses each including radial surfaces of said sleeve serving as a counterplate to each said thrust plate and are each joined by an axial surface which faces each said radial and axial surface of said thrust plates to thereby define a continuous gap around each said thrust plate, said gap further extending between internal axial faces of said counterplates and extending parallel to an axial face of said fixed shaft between each said thrust plate, so that said continuous gap is defined from between said shaft and said sleeve, and lubricating fluid flowing in said gap between said shaft and said sleeve and said thrust plates and said sleeve and/or counterplate so that said sleeve is free to rotate relative to said fixed shaft while maintaining the stiffness of said sleeve relative to said shaft.

2. A hydrodynamic bearing cartridge as claimed in claim 1 wherein said fixed shaft includes a reservoir extending along a central axis of said shaft, and having at least one radial bore extending from said reservoir to a section of said gap separated by at least one of said thrust plates from an end of said shaft, so that with rotation of said sleeve, said fluid is maintained in said reservoir, said gap, and said bore.

3. A hydrodynamic bearing cartridge as claimed in claim 2 wherein an end section of said shaft rotating within said sleeve comprises a capillary seal defined between walls of said sleeve and one of said end sections of said shaft wherein one of said walls of said shaft or said sleeve diverges from the other of said walls so that said fluid is maintained in said gap between said shaft and said sleeve.

4. A hydrodynamic bearing cartridge as claimed in claim 2 wherein at least one of said radial bores extends from said reservoir to a central section of said gap extending between said first and second thrust plates, so that with rotation of said sleeve, said lubricating fluid maintained in said gap defined by said thrust plates.

5. A hydrodynamic bearing cartridge as claimed in claim 4 further including grooves formed on at least one of the radial surfaces of each of the thrust plates and counterplates separated by said gap.

6. A hydrodynamic bearing cartridge as claimed in claim 5 wherein said groove patterns are formed on both of said radially extending surfaces of said counter-plates or said sleeve.

7. A hydrodynamic bearing cartridge as claimed in claim 5 wherein said grooves are formed on said outer surface of said shaft or said end section of said inner surface of said sleeve facing said end sections of said shaft, said central gap defined by central surfaces of said shaft and said sleeve.

8. A hydrodynamic bearing cartridge as claimed in claim 4 wherein said groove patterns are formed on radially extending surfaces of said first and second thrust plates.

9. A hydrodynamic bearing as claimed in claim 4 wherein one of said thrust plates is supported at a first end of said shaft, and wherein said sleeve supports a top counterplate facing a thrust plate to define a portion of said hydrodynamic bearing gap, relative rotation of said plate and said counterplate maintaining said fluid in said gap.

10. A hydrodynamic bearing as claimed in claim 9 wherein said reservoir terminates at said gap portion between thrust plate and counterplate, relative rotation causing movement of said fluid through said reservoir and said gap.

11. A hydrodynamic bearing as claimed in claim 10 wherein said reservoir extends along a centerline of said shaft from said end of said shaft facing said top counterplate.

12. A method of assembling the hydrodynamic bearing cartridge of claim 2 including providing a sleeve with at least first and second axially separated steps defined thereon, said steps having different radii, and inserting a first and a second counterplates to rest on said first and second steps so that said gaps between said thrust plates and said counterplate portions of said sleeve are accurately defined.

13. A hydrodynamic fluid bearing cartridge as claimed in claim 2 wherein said bearing fluid includes gas and liquid.

14. A hydrodynamic bearing as claimed in claim 1 or claim 2 wherein said fluid comprises gas.

* * * * *